United States Patent
Schuh et al.

(10) Patent No.: US 12,299,318 B2
(45) Date of Patent: *May 13, 2025

(54) DATA REORDERING AT A MEMORY SUBSYSTEM

(71) Applicant: Micron Technolgy, Inc., Boise, ID (US)

(72) Inventors: Karl David Schuh, Santa Cruz, CA (US); Kishore Kumar Muchherla, Fremont, CA (US); Daniel Jerre Hubbard, Boise, ID (US); James Fitzpatrick, Laguna Niguel, CA (US)

(73) Assignee: Micron Technolgy, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,653

(22) Filed: Jan. 31, 2024

(65) Prior Publication Data

US 2024/0176532 A1 May 30, 2024

Related U.S. Application Data

(63) Continuation of application No. 17/723,244, filed on Apr. 18, 2022, now Pat. No. 11,934,686.

(51) Int. Cl.
*G06F 12/00* (2006.01)
*G06F 3/06* (2006.01)
*G06F 12/02* (2006.01)

(52) U.S. Cl.
CPC .......... *G06F 3/0655* (2013.01); *G06F 3/0604* (2013.01); *G06F 3/0679* (2013.01); *G06F 12/02* (2013.01)

(58) Field of Classification Search
CPC ...... G06F 3/0655; G06F 3/0659; G06F 3/061; G06F 12/0246; G06F 3/0688; G06F 3/0604; G06F 12/02; G06F 3/0679; G06F 2212/7205

See application file for complete search history.

(56) References Cited

U.S. PATENT DOCUMENTS

| | | | |
|---|---|---|---|
| 9,189,515 B1* | 11/2015 | Tamilmani | G06F 16/245 |
| 9,535,948 B1* | 1/2017 | Cuthbert | G06F 16/2452 |
| 10,783,603 B2* | 9/2020 | Venkatesh | G06T 1/60 |
| 2002/0129200 A1* | 9/2002 | Arakawa | G11B 20/10 |
| 2005/0251716 A1* | 11/2005 | Degrenand | G06F 11/2221 714/736 |
| 2006/0020749 A1 | 1/2006 | Waldvogel | |
| 2013/0173847 A1 | 7/2013 | Sprouse et al. | |
| 2014/0195725 A1* | 7/2014 | Bennett | G06F 12/0246 711/103 |
| 2016/0085455 A1* | 3/2016 | Cohen | G06F 3/0611 711/103 |

(Continued)

*Primary Examiner* — John A Lane
(74) *Attorney, Agent, or Firm* — Lowenstein Sandler LLP

(57) ABSTRACT

A set of data items programmed to a first region of a memory subsystem is identified. The set of data items is programmed to the first region according to an initial sequence. A determination is made of whether the initial sequence corresponds to a target sequence associated with accessing the set of data items. Responsive to a determination that the initial sequence does not correspond to the target sequence, the set of data items is copied from the first region to a second region of the memory subsystem according to the target sequence.

20 Claims, 6 Drawing Sheets

(56) References Cited

U.S. PATENT DOCUMENTS

| | | | |
|---|---|---|---|
| 2019/0392062 A1* | 12/2019 | Danilov | G06F 16/2365 |
| 2020/0057567 A1 | 2/2020 | Hutcheson et al. | |
| 2020/0082215 A1* | 3/2020 | Aliabadi | G06V 10/82 |
| 2020/0210100 A1 | 7/2020 | Li et al. | |
| 2023/0004318 A1* | 1/2023 | Zhang | G06F 3/0611 |
| 2023/0195319 A1* | 6/2023 | Inglis | G06F 12/0802 |
| | | | 711/165 |
| 2023/0195350 A1 | 6/2023 | Muchherla et al. | |
| 2023/0223957 A1* | 7/2023 | Li | H04L 1/0058 |
| | | | 714/752 |
| 2024/0192890 A1* | 6/2024 | Mulani | G06F 3/0679 |

* cited by examiner

DATA REORDERING AT A MEMORY SUBSYSTEM

RELATED APPLICATIONS

This application is a continuation of U.S. patent application Ser. No. 17/723,244, filed Apr. 18, 2022, the entire contents of which is hereby incorporated by reference herein.

TECHNICAL FIELD

Embodiments of the disclosure relate generally to memory subsystems, and more specifically, relate to data reordering at a memory subsystem.

BACKGROUND

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
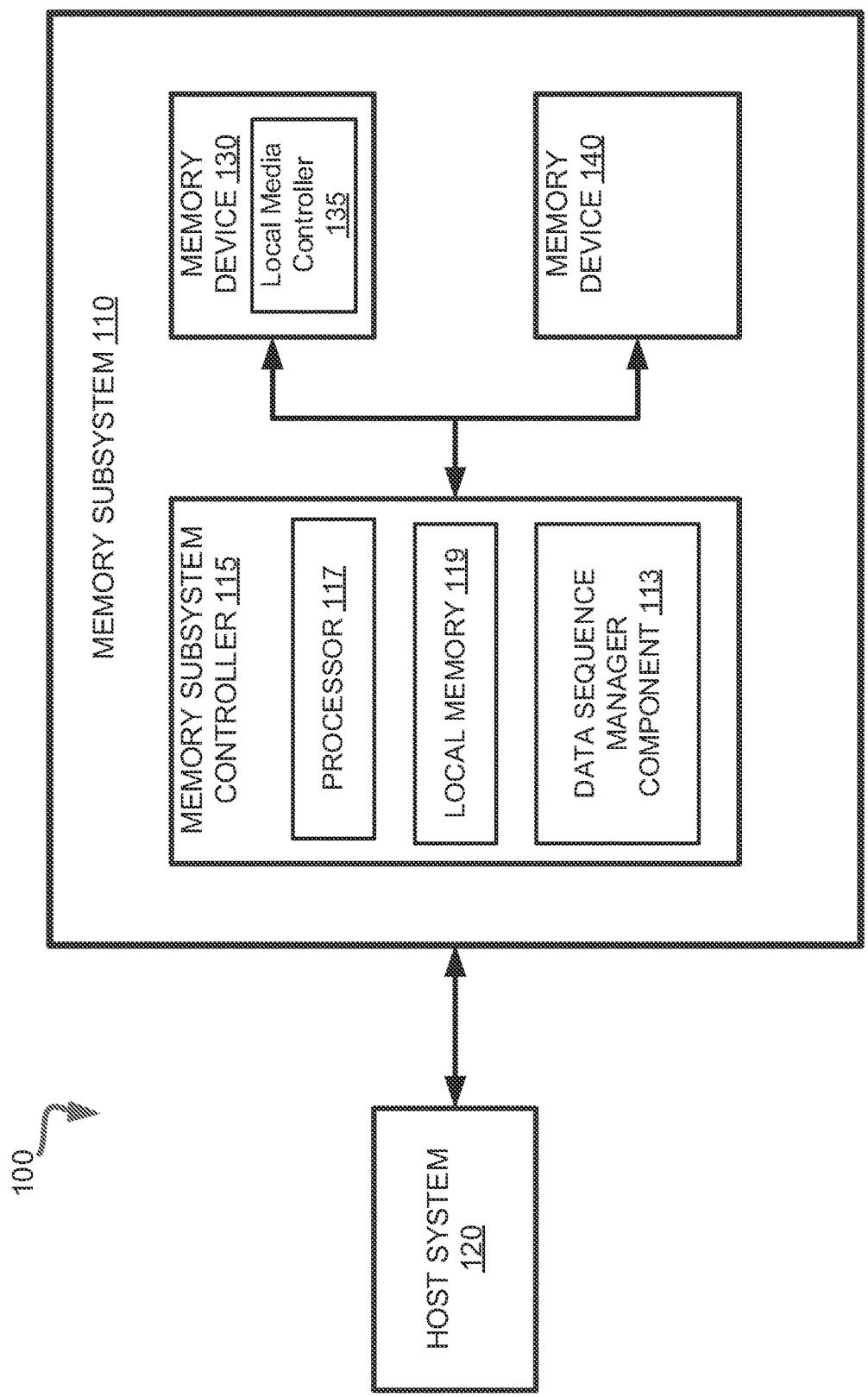
FIG. 1 illustrates an example computing system that includes a memory subsystem, in accordance with some embodiments of the present disclosure.

Aspects of the present disclosure are directed to data reordering at a memory subsystem. A memory subsystem can be a storage device, a memory module, or a combination of a storage device and memory module. Examples of storage devices and memory modules are described below in conjunction with FIG. 1. In general, a host system can utilize a memory subsystem that includes one or more memory components, such as memory devices that store data. The host system can provide data to be stored at the memory subsystem and can request data to be retrieved from the memory subsystem.

A memory subsystem can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. An example of a "block" is an "erasable block," which is the minimal erasable unit of memory, while "page" is a minimal writable unit of memory. Each page includes a set of memory cells. A memory cell is an electronic circuit that stores information. Some types of memory, such as 3D cross-point, can group pages across dice and channels to form logical units (LUNs) (also referred to as management units (MUs)). A LUN can correspond to a page, a block, etc. In some instances, a group of LUNs that are grouped together for management purposes can be referred to as a super LUN (SLUN).

A memory device can include multiple memory cells arranged in a two-dimensional grid. The memory cells are formed onto a silicon wafer in an array of columns and rows. A memory cell includes a capacitor that holds an electric charge and a transistor that acts as a switch controlling access to the capacitor. Accordingly, the memory cell may be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

Data operations can be performed by the memory subsystem. The data operations can be host-initiated operations. For example, the host system can initiate a data operation (e.g., write, read, erase, etc.) on a memory subsystem. The host system can send access requests (e.g., write command, read command) to the memory subsystem, such as to store data on a memory device at the memory subsystem and to read data from the memory device on the memory subsystem. The data to be read or written, as specified by a host request, is hereinafter referred to as "host data." A host request can include a logical address (e.g., a logical block address (LBA) and namespace) for the host data, which is the location that the host system associates with the host data. The logical address information (e.g., LBA, namespace) can be part of metadata for the host data. A host data item can refer to one or more units of host data received from the host system, as described above.

As described above, a die can contain one or more planes. A memory subsystem can use a striping scheme to treat various sets of data as units when performing data operations (e.g., write, read, erase, etc.). A die stripe refers to a collection of planes that are treated as one unit when writing, reading, or erasing data. A controller of a memory device (i.e., a memory subsystem controller, a memory device controller, etc.) can execute the same operation and can carry out the same operation, in parallel, at each plane of a dice stripe. A block stripe is a collection of blocks, at least one from each plane of a die stripe, that are treated as a unit. The blocks in a block stripe can be associated with the same block identifier (e.g., block number) at each respective plane. A page stripe is a set of pages having the same page identifier (e.g., the same page number), across a block stripe, and treated as a unit. A LUN stripe is a collection of LUNs, at least one from each plane of a die stripe, a block stripe, a page stripe, etc., which are treated as a unit.

Each memory device of a memory subsystem can be associated with a respective data channel. A data channel refers to a connection (e.g., a bus, etc.) between a memory device and a memory subsystem controller that facilitates the transfer of data between the memory device and the controller. Such architecture enables the memory subsystem controller to access data at multiple different memory devices in parallel (e.g., simultaneously). For example, the memory subsystem controller can read data residing on LUNs of a LUN stripe across a first memory device and a second memory device simultaneously (or approximately simultaneously) via a first data channel connected to the first memory device and a second data channel connected to the second memory device. The controller can also sequentially access data residing on different LUN stripes of a single memory device. For example, the memory subsystem controller can perform a first read operation to read data residing on LUNs of a first LUN stripe at a memory device via a respective data channel, a second read operation to read data residing on LUNs of a second LUN stripe at the memory device via the respective channel, and so forth.

As indicated above, a host system can transmit host data to a memory subsystem for programming at one or more memory devices of the memory subsystem. Each host data item can be associated with a logical address (e.g., a LBA, etc.), which, in some instances, corresponds to a sequence or an ordering of the host data, as defined by the host system. For example, the host system can provide host data associated with a text file. A first host data item of the provided host data can correspond to a first line of text of the text file and can be assigned a first logical address, a second host data item can correspond to a second line of the text file and can be assigned a second logical address, and so forth. In some instances, the host system provides a particular amount of host data for programming to the memory subsystem (referred to herein as a data burst) and does not transmit any additional host data to the memory subsystem until receiving a notification that the host data is stored at the memory subsystem. In some embodiments, the memory subsystem controller is not able to immediately program host data of a data burst when the data burst is received (e.g., if the memory controller is performing operations associated with other tasks when the data burst is received, etc.). Accordingly, the memory subsystem controller can temporarily store the host data of the data burst in a memory buffer until the controller is able to program the host data. Once the host data is added to the memory buffer, the controller can transmit a notification to the host system that the host data is stored at the memory subsystem and the host system can transmit another data burst to the memory subsystem.

In some instances, the memory subsystem controller can accumulate host data in the memory buffer until enough data is collected to program the host data in a single programming operation at each LUN of a LUN stripe residing across multiple memory devices (e.g., via respective data channels for each memory device). For example, if the memory subsystem controller is operating in a single level cell (SLC) programming mode (i.e., the controller programs one unit of data per memory cell of the memory device), the memory subsystem controller can accumulate host data from data bursts of the host system in the memory buffer until enough host data is collected to program the accumulated host data to each memory cell of a LUN stripe residing across multiple memory devices in a single programming operation. The controller can program the accumulated host data to the LUN stripe in accordance with a sequence or ordering of the logical addresses associated with each host data item. In some instances, the memory buffer may not be large enough to store an amount of data that is sufficient to program each memory cell of a LUN stripe. In another example, if the memory subsystem controller is operating in a multiple level cell (MLC) programming mode (i.e., the controller programs multiple bits of data per memory cell of the memory device), the amount of data that is sufficient to program each MLC of a LUN stripe can be larger than the amount of data that is sufficient to program SLCs of a LUN stripe, and the memory buffer may not be large enough to store the sufficient amount of data. For instance, the amount of sufficient data can be twice as large for multi-level cells (i.e., cells configured to store two bits of data), three times as large for triple level cells (TLCs) (i.e., cells configured to store three bits of data), four times as large for quadruple level cells (QLCs) (i.e., cells configured to store four bits of data, and so forth.

If the memory buffer is not large enough to store an amount of data that is sufficient to program each memory cell of a LUN stripe in the memory buffer, the memory subsystem controller can program data stored to the memory buffer to a portion of memory that is sufficient to store some or all of the stored data to a space in the memory buffer to store additional incoming host data from the host system. In some instances, the memory subsystem controller can program host data from the memory buffer to LUNs of multiple LUN stripes residing on a single memory device via multiple sequential programming operations in accordance with a sequence or ordering of the logical addresses associated with each data item (e.g., a first data item and a second data item are programmed to memory cells of a first stripe of a memory device, a third data and a fourth data item are programmed to memory cells of a second stripe of a memory device, etc.). When the host system requests to read such data from the memory device, the memory subsystem controller performs multiple sequential read operations to access the data residing from each LUN stripe of the memory device. In accordance with the previous example, the controller performs a first read operation to read the first data item and the second data item from memory cells of the first stripe of the memory device, a second read operation to read the third data item and the fourth data item from memory cells of the second stripe of the memory device, and so forth.

As indicated above, in some instances, multiple programming operations can be performed to program sequential host data items to memory devices of a memory subsystem (e.g., if the memory buffer is not large enough to store an amount of data that is sufficient for performing parallel programming operations across a LUN stripe, etc.). In addition, multiple read operations can be performed to read sequential host data items from LUNs stripes of a memory device. As multiple programming operations and/or read operations are performed to program host data to and/or read host data from a memory subsystem, a memory access performance (e.g., a memory access efficiency, a memory access latency, etc.) of the memory subsystem can be significantly low (e.g., degraded). In addition, a significant amount of processing resources (e.g., processing cycles, etc.) can be consumed during performance of such programming and/or read operations. Such resources are not available to other processes of the memory subsystem, which can decrease an overall efficiency and/or increase an overall latency of the memory subsystem.

Aspects of the present disclosure address the above and other deficiencies by providing a scheme for reordering data at a memory subsystem. In some embodiments, a memory subsystem controller (e.g., memory subsystem controller 115 of FIG. 1) can receive a set of host data items for programming to the memory subsystem. Each of the set of host data items can be associated with a respective logical address, which corresponds to a sequence or ordering of the host data, as defined by the host system. The memory subsystem controller can program the set of host data items to one or more memory devices of a first region of the memory subsystem. In some embodiments, the controller can temporarily store the host data items in a memory buffer. If the memory buffer is not large enough to accumulate an amount of data that is sufficient to program the accumulated data to each LUN of a LUN stripe residing across the one or more memory devices of the first region, the controller can program host data items that are stored in the memory buffer to a portion of the first region that is large enough to store some or all of the data in the memory buffer in accordance with the sequence or ordering of the accumulated data.

In response to programming the host data (e.g., from the memory buffer) to the first region, the memory subsystem controller can determine that a sequence or ordering at which the set of host data items are programmed across memory devices of the first region does not correspond to a target sequence. For example, the memory subsystem controller can determine that host data is programed to memory devices of the first region such that multiple sequential read operations are to be performed to access the host data (e.g., sequential host data items are programmed to different LUN stripes of a single memory device, etc.). The memory subsystem controller can determine that the sequence that the host data is programmed to the first region does not correspond to a sequence that enables the controller to access the host data via a single memory access operation using data channels of one or more memory devices of the first region (i.e., the target sequence). In some embodiments, the memory subsystem controller can determine that the sequence for the host data does not correspond to the target sequence in response to detecting that a media management operation is to be performed at the first region of the memory subsystem. A media management operation refers to an operation performed by a memory subsystem controller to maintain an integrity of memory cells at the memory subsystem and/or improve memory sub-system performance. A media management operation can include a garbage collection operation, which is an operation to move valid data to available memory cells of a memory subsystem and remove (e.g., erase) invalid data from the memory sub-system to create larger, unfragmented areas of free memory.

Responsive to determining that the sequence for the host data does not correspond to the target sequence, the memory subsystem controller can identify a second region of the memory subsystem that is sufficient to store data programmed to the first region (e.g., in accordance with the garbage collection operation). The controller can determine a sequence or ordering of valid data residing at the first region of the memory subsystem (e.g., based on the logical addresses associated with the valid data) that corresponds to the target sequence and can copy the valid data from the first region to the second region of the memory subsystem, in accordance with the determined sequence or ordering. The controller can remove (e.g., erase) the valid (and invalid) data from the first region of the memory subsystem (e.g., in accordance with the garbage collection operation). In response to receiving a request from the host system to access data copied to the second region, the memory subsystem controller can execute one or more memory access operations to access the host data via the second region in accordance with the target sequence.

Advantages of the present disclosure include, but are not limited to, providing a scheme that enables a memory subsystem controller to reorder data at a memory subsystem that was not originally programmed according to a target sequence or ordering. By enabling the controller to reorder data at the memory subsystem, the controller can access host data by executing a fewer number of memory access operations (e.g., by executing a single operation to access data via multiple memory devices in parallel rather than executing multiple operations to access the data via a single memory device, etc.). By performing fewer memory access operations, a memory access performance for the memory subsystem is improved, and fewer system resources are consumed to access data, which increases an overall system efficiency and decreases an overall system latency. Additionally, embodiments of the present disclosure enable the memory subsystem to reorder data during performance of a scheduled media management operation (e.g., a garbage collection operation) at the memory subsystem, which reduces an overall number of maintenance operations performed at the memory subsystem, which further improves an overall system efficiency and decreases an overall system latency.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to multiple memory subsystems 110 of different types. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the physical host interface (e.g., PCIe bus). The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations. The memory subsystem controller 115 can include hardware such as one or more integrated circuits and/or discrete components, a buffer memory, or a combination thereof. The hardware can include a digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or other suitable processor.

The memory subsystem controller 115 can include a processing device, which includes one or more processors (e.g., processor 117), configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem).

In general, the memory subsystem controller 115 can receive commands or operations from the host system 120 and can convert the commands or operations into instructions or appropriate commands to achieve the desired access to the memory devices 130. The memory subsystem controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, memory subsystem 110 is a managed memory device, which is a raw memory device 130 having control logic (e.g., local media controller 135) on the die and a controller (e.g., memory subsystem controller 115) for media management within the same memory device package. An example of a managed memory device is a managed NAND (MNAND) device.

In one embodiment, the memory subsystem 110 includes a data sequence manager component 113 (referred to as data sequence manager 113) that can manage a sequence of data (e.g., host data) that is programmed across one or more memory devices 130, 140 of memory subsystem 110. In some embodiments, the memory subsystem controller 115 includes at least a portion of the data sequence manager component 113. For example, the memory subsystem controller 115 can include a processor 117 (processing device) configured to execute instructions stored in local memory 119 for performing the operations described herein. In some embodiments, the data sequence manager component 113 is part of the host system 120, an application, or an operating system.

As described above, host system 120 can provide host data for programming to memory devices 130, 140 of memory subsystem 110 (e.g., in a data burst). In some embodiments, memory subsystem controller 115 can temporarily store the provided host data in a memory buffer (e.g., residing in local memory 119, etc.) before the host data is programmed to memory devices 130, 140. For example, memory subsystem controller 115 can temporarily store the host data in the memory buffer if the memory subsystem controller 115 is unable to program the host data to memory devices 130, 140 when the host data is received. Memory subsystem controller 115 can, in some embodiments, accumulate host data from multiple data bursts in the memory buffer for programming to memory devices 130, 140.

In some embodiments, the memory buffer is not large enough to store a sufficient amount of data that can be programmed to each LUN (e.g., block, page, etc.) of a LUN stripe via a single parallel programming operation across memory devices 130, 140. For example, if memory subsystem controller 115 is operating in a MLC programming mode, the memory buffer may not be large enough to store a sufficient amount of data that can be programmed to each MLC (e.g., TLC, QLC, etc.) of each LUN associated with a LUN stripe across memory devices 130, 140. In such embodiments, memory subsystem controller 115 can identify a portion of memory devices 130, 140 that is sufficient to store the host data temporarily stored in the memory buffer and that the controller 115 can program the host data in an optimal (e.g., a minimal) number of programming operations. The memory subsystem controller 115 can, in some embodiments, program host data from the memory buffer to LUNs of multiple LUN stripes residing on a single memory device 130, 140 via a single programming operation (e.g., via the data channel connected to the memory device 130, 140). The host data can be programmed to LUNs of the single memory device 130, 140 in accordance with a sequence or ordering of logical addresses associated with each data item of the host data. For example, memory subsystem controller 115 can program a first data item and a second data item (associated with a first logical address and a second logical address, respectively) to memory cells of a first LUN stripe of memory device 130, a third data item and a fourth data item (associated with a third logical address and a fourth logical address, respectively) to memory cells of a second LUN stripe of memory device 130, and so forth. In some embodiments, the sequence at which memory subsystem controller 115 programmed the data items to the memory device 130, 140 does not correspond to a target sequence because memory subsystem controller 115 is to perform multiple sequential memory access operations to access the sequential data programmed to the memory device 130, 140. Further details regarding the target sequence are provided herein.

Data sequence manager 113 can be configured to implement a scheme for reordering data programmed to memory devices 130, 140 to correspond to a target sequence. In some embodiments, data sequence manager 113 can determine that a sequence that data is programmed to first regions of memory devices 130, 140 does not correspond to a target sequence. A data sequence can correspond to a target sequence if the memory subsystem controller can access sequential data from memory devices 130, 140 by performing an optimal (e.g., a minimal) number of access operations at memory devices 130, 140. For example, if a first data item (associated with a first logical address) is programmed to memory cells of a first LUN stripe at a first memory device 130, 140 and a second data item (associated with a second logical address) is programmed to memory cells of the first LUN stripe at a second memory device 130, 140, memory subsystem controller 115 can access the first data item and the second data item simultaneously (or approximately simultaneously) by performing a single read operation via a first data channel connected to the first memory device 130, 140 and a second data channel connected to the second memory device 130, 140. Accordingly, the sequence that the first data item and the second data item is programmed across memory devices 130, 140 corresponds to a target sequence.

As indicated above, data sequence manager 113 can determine that the sequence that data is programmed to first regions of memory devices 130, 140 does not correspond to a target sequence. In some embodiments, a detection that a memory management operation (e.g., a garbage collection operation) is to be performed at the memory devices 130, 140 can cause data sequence manager 113 to determine whether the sequence that the data is programmed to the first regions corresponds to the target sequence. In response to determining that the sequence does not correspond to a target sequence, data sequence manager 113 can determine a sequence of data residing at the first regions that corresponds to the target sequence and can copy the data from the first regions to second regions of the memory subsystem in accordance with the determined sequence. In some embodiments, the copied data is valid data, as determined in accordance with the memory management operation. Data sequence manager 113 (or another component of memory subsystem controller 115) can erase the data from the first regions of memory devices 130, 140 (i.e., in accordance with the garbage collection operation) and can access the data items via the second region in accordance with the target sequence. Further details regarding data sequence manager 113 and reordering data to correspond to a target sequence are provided herein.

Figure 2:
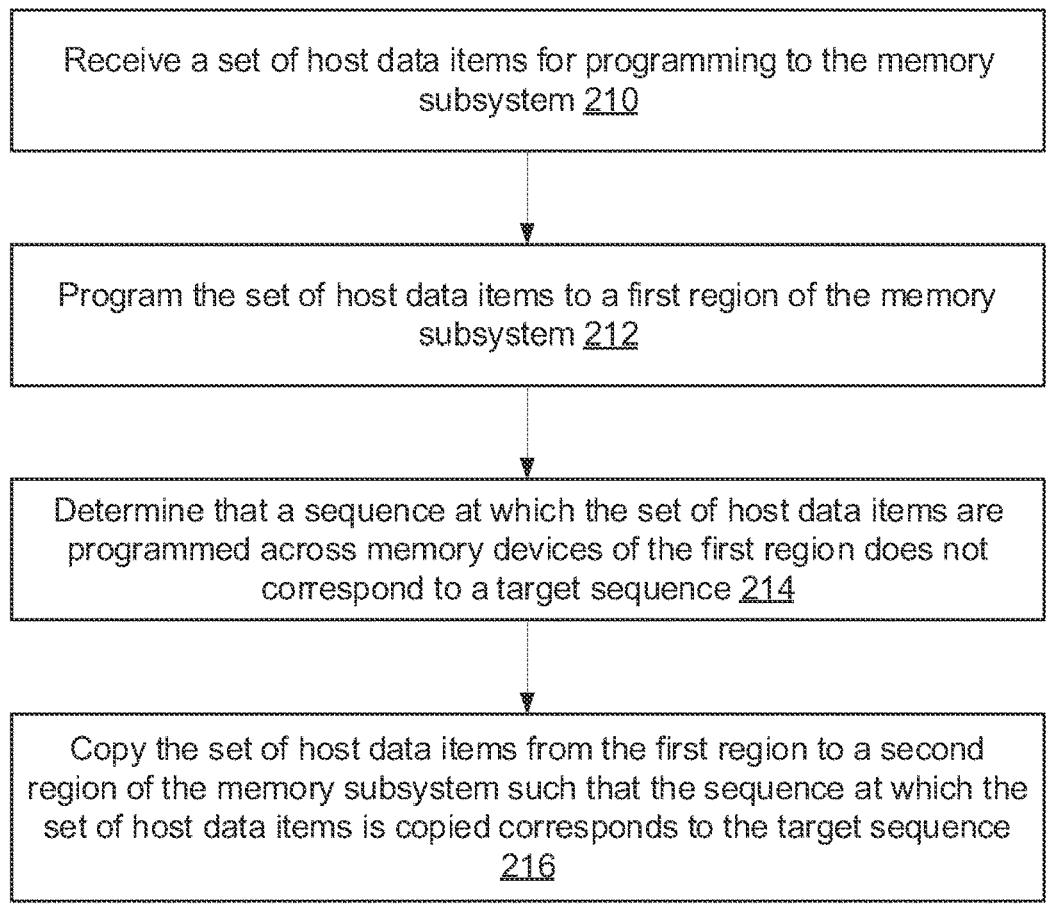
FIG. 2 is a flow diagram of an example method for data reordering at a memory subsystem, in accordance with some embodiments of the present disclosure.

FIG. 2 is a flow diagram of an example method 200 for data reordering at a memory subsystem, in accordance with embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of method 200 are performed by the data sequence manager 113 of FIG. 1. In other or similar embodiments, one or more operations of method 200 is performed by another component of the memory subsystem controller 115, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 210, processing logic receives a set of host data items for programming to the memory subsystem. As indicated above, processing logic (e.g., memory subsystem controller 115) can receive a set of host data items to be programmed to memory devices 130, 140 of memory subsystem 110 from host system 120 (e.g., via a data burst). Each of the set of host data items can be associated with a corresponding logical address. In some embodiments, each logical address can correspond to a sequence or ordering of the host data items, as defined by host system 120. For example, the set of host data items can correspond to a portion of a text file. A first host data item of the set of host data items can include a first line of text of the text file and can be assigned a first logical address, a second host data item can include a second line of text of the text file and can be assigned a second logical address, and so forth. In some embodiments, the memory subsystem controller 115 can temporarily store the set of host data items in a memory buffer (e.g., at local memory 119), in accordance with previously described embodiments.

At block 212, processing logic programs the set of host data items to a first region of the memory subsystem. As indicated above, in some embodiments, the set of host data items can be temporarily stored in a memory buffer before being programmed to memory devices 130, 140 of memory subsystem 110. In some embodiments, the memory buffer is not large enough to store a sufficient amount of host data to be programmed to each LUN of a LUN stripe across one or more memory devices 130, 140 of memory subsystem 11. In such embodiments, memory subsystem controller 115 can program the set of host data items from the memory buffer to a region of memory that is sufficient to store the set of host data items. In some embodiments, memory subsystem controller 115 can program the set of host data items according to a single-pass programming scheme (e.g., the host data items are available for read operations after the host data items are programmed to the first region once) or a multi-pass programming scheme (e.g., the host data items are available for read operations after the host data items are programmed to the first region once and reprogrammed to the first region one or more times).

Figure 3A:
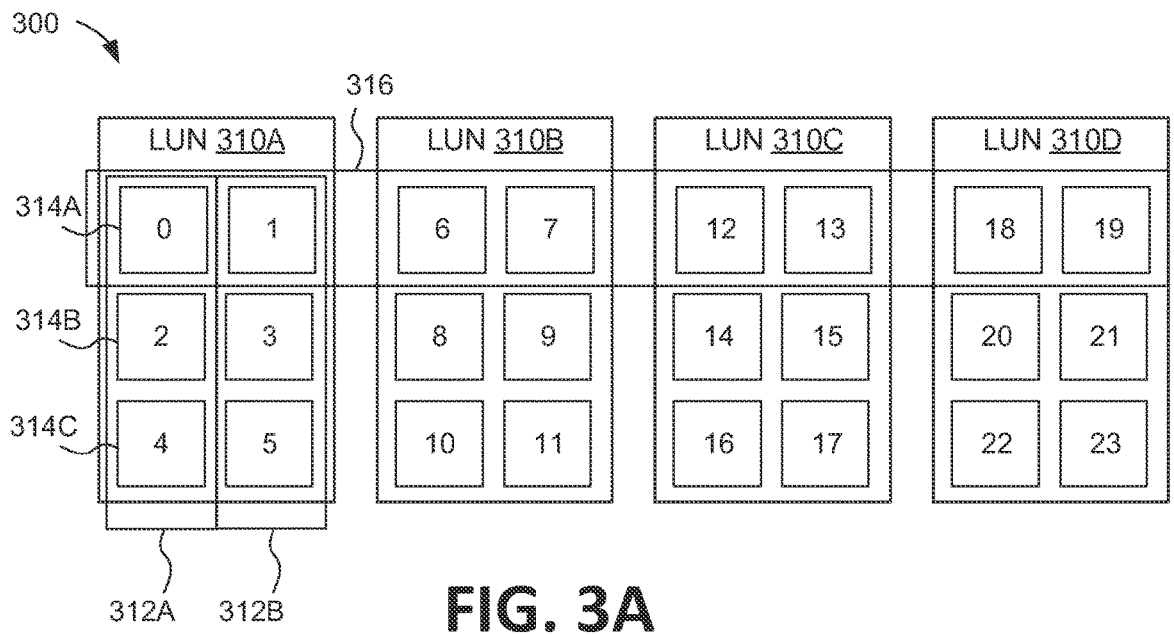
FIGS. 3A-3B depict an example of data reordering at a memory subsystem, in accordance with some embodiments of the present disclosure.

FIG. 3A illustrates an example of a set of host data items programmed to a first region 300 of memory subsystem 110. In some embodiments, the first region 300 of memory subsystem 110 can include one or more LUNs (e.g., 310A, 310B, 310C, 310D). A LUN can correspond to a memory device, a plane, a block, a page, etc. For purposes of example only, LUNs 310A, 310B, 310C and 310D are described as memory devices, such as memory devices 130, 140 described with respect to FIG. 1. However, it should be noted that LUNs 310A, 310B, 310C and 310D can correspond to any unit of memory (e.g., a plane, a block, a page, etc.) of memory subsystem 110.

In one example embodiment, each LUN 310 of region 300 can include one or more planes 312 that include memory cells of one or more pages 314. For instance, as illustrated in FIG. 3A, LUNs 310 can each include a first plane 312A and a second plane 312B. First plane 312A and second plane 312B can each include memory cells of a first memory page 314A, memory cells of a second memory page (e.g., memory page 314B), and/or memory cells for a third memory page (e.g., memory page 314C). It should be noted that although FIG. 3A depicts LUNs 310 as including two planes and each plane including memory cells for three memory pages, LUNs 310 can include any number of planes and each plane can include memory cells for any number of memory pages.

In some embodiments, region 300 can include one or more stripes 316 across LUNs 310A-D. Each stripe 316 can include memory cells for corresponding memory pages at each LUN 310. For example, as illustrated in FIG. 3A, stripe 316 can include memory cells for pages 314A in each plane 312 of each LUN 310. As indicated above, each LUN 310 can be connected to a respective data channel. Memory subsystem controller 115 can access data residing at LUNs 310 via the respective data channels. In some embodiments, memory subsystem controller 115 can access data at memory cells of page 314A of each plane 312 of LUNs 310A-D in parallel (e.g., simultaneously or approximately simultaneously) by performing a single programming operation via the data channels connected to LUNs 310A-D.

As described above, memory subsystem controller 115 can program the set of host data items (e.g., from the memory buffer) to the first region 300 of memory subsystem 110. In some embodiments, memory subsystem controller 115 programs the set of host data items to the first region 300 in response to detecting that the memory buffer that temporarily stores the set of host data items is full or is almost full. Memory subsystem controller 115 can program the set of host data items from the memory buffer to a portion of memory at region 300 that is sufficient to store the set of host data items. For example, the set of host data items may not include enough data for programming at memory cells of each page 314A of stripe 316 across LUNs 310A-D (e.g., memory cells of eight memory pages of stripe 316) via a single programming operation. However, the set of host data items may include enough data for programming at memory cells of LUN 310A (e.g., memory cells of six memory pages of LUN 310A) via a single programming operation. Accordingly, memory subsystem controller 115 can program the set of host data items to the memory cells of LUN 310A via the single programming operation. In some embodiments, the memory subsystem controller 115 can program the set of host data items to memory cells of LUN 310A in accordance with a sequence or ordering of the host data items, as defined by host system 120.

In an illustrative example, the set of host data items can include data items associated with logical addresses "0"-"5." As illustrated in FIG. 3A, memory subsystem controller 115 can program each host data item to memory cells of LUN 310A in accordance with the sequence or ordering of logical addresses "0"-"5" (e.g., the data item having logical address "0" is programmed to cells of memory page 314A of plane 312A, the data item having logical address "1" is programmed to cells of memory page 314A of plane 312B, the data item having logical address "2" is programmed to cells of memory page 314B of plane 312A, etc.). As further illustrated in FIG. 3A, memory subsystem controller 115 can program additional host data items to other LUNs 310 of region 300, as described above. For example, for another set of host data items having logical addresses "6"-"11," memory subsystem controller 115 can program a data item having logical address "6" to memory page 314A of plane 312A at LUN 310B, another data item having logical address "7" to memory page 314A of plane 312B at LUN 310B, and so forth.

At block 214, processing logic determines that a sequence at which the set of host data items are programmed across memory devices of the first region does not correspond to a target sequence. The target sequence can correspond to a sequence of host data programmed across LUNs 310A-D that minimizes a number of reading operations performed to read the host data from region 300. The number of reading operations associated with the target sequence can be fewer than the number of reading operations associated with the sequence at which the set of host data items are programmed across the one or more memory devices of the first region. In some embodiments, processing logic (e.g., data sequence manager 113) can determine that the sequence does not correspond to the target sequence by determining that a number of read operations that are to be performed to read a respective set of host data items from region 300 does not correspond to a target number of access operations (e.g., based on an architecture of memory subsystem 110, etc.). In some instances, data sequence manager 113 can determine this without performing the read operations. For example, data sequence manager 113 can determine, based on the size of each host data items and an architecture of memory subsystem 110, that memory subsystem controller 115 can access a set of host data items that are sequentially programmed across LUNs 310A-310D via a single read operation. Accordingly, the target number of access operations can correspond to one access operation. Data sequence manager 113 can additionally, or alternatively, determine the target number of access operations based on one or more configuration settings for the memory subsystem 110. Data sequence manager 113 can also determine the actual number of access operations to be performed to read each of the set of host data items. For instance, data sequence manager 113 can identify regions of memory subsystem 110 that store each of the set of host data items (e.g., using a logical-to-physical (L2P) data structure) and can determine that, given the sequence of that the host data items are programmed across the identified regions and the architecture of the memory subsystem 110, multiple read operations are to be performed to read each of the set of host data items. In accordance with at least one previous example, data sequence manager 113 can determine (e.g., based on the sequence of the host data items and the architecture of memory subsystem 110) that to read host data items having logical addresses "0"-"5" programmed to LUN 310A, memory subsystem controller 115 is to perform three read operations (e.g., a first read operation to read host data items having logical addresses "0" and "1" from pages 314A of planes 312A and 312B, a second read operation to read host data items having logical addresses "2" and "3" from pages 314B of planes 312A and 312B, and a third read operation to read host data items having logical addresses "4" and "5" from pages 314C from planes 312A and 312B). As the number of access operations that are to be performed to read the set of host data items is larger than the target number of access operations, data sequence manager 113 can determine that the sequence at which the set of host data items is programmed across LUNs 310A-D does not correspond to the target sequence.

At block 216, processing logic (e.g., data sequence manager 113) copies the set of host data items from the first region to a second region of the memory subsystem (e.g., region 350 illustrated in FIG. 3B), such that the sequence at which the set of host data items is copied to the second region corresponds to the target sequence. Data sequence manager 113 can identify or select the region for copying the set of host data items based on one or more settings for a media management protocol for memory subsystem 110. For example, data sequence manager 113 can identify a region that is to store garbage collected data at the memory subsystem, in accordance with a media management protocol. Data sequence manager 113 can select this region as the second region to store the copied host data items. In other or similar embodiments, data sequence manager 113 can identify the second region as any region of memory subsystem 110 that includes a sufficient number of available memory cells to store the copied host data items.

Figure 4:
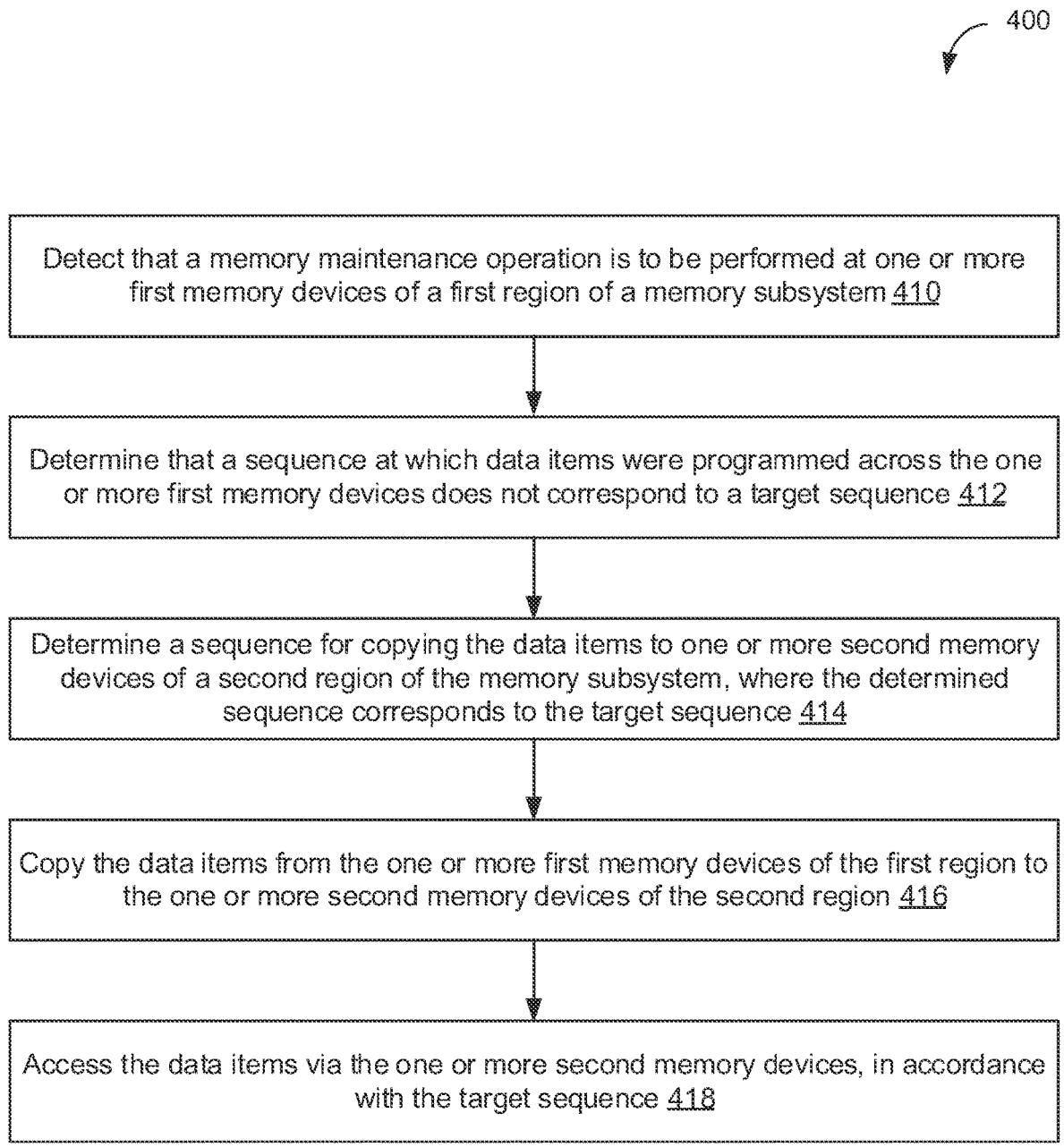
FIG. 4 is a flow diagram of another example method for data reordering at a memory subsystem, in accordance with some embodiments of the present disclosure.
Figure 5A:
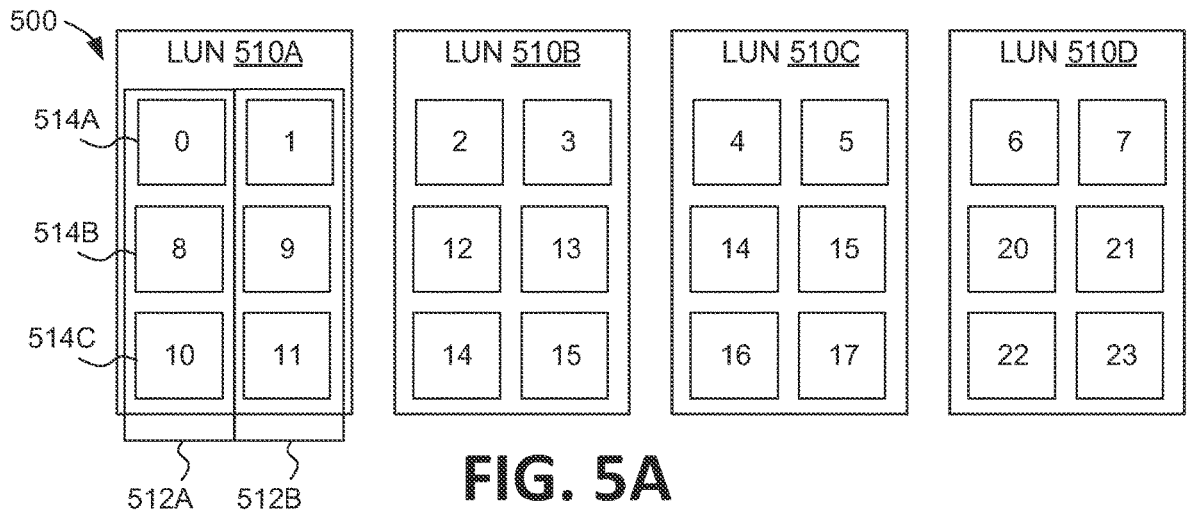
FIGS. 5A-C depict an example of data reordering at a memory subsystem, in accordance with some embodiments of the present disclosure.
Figure 5B:
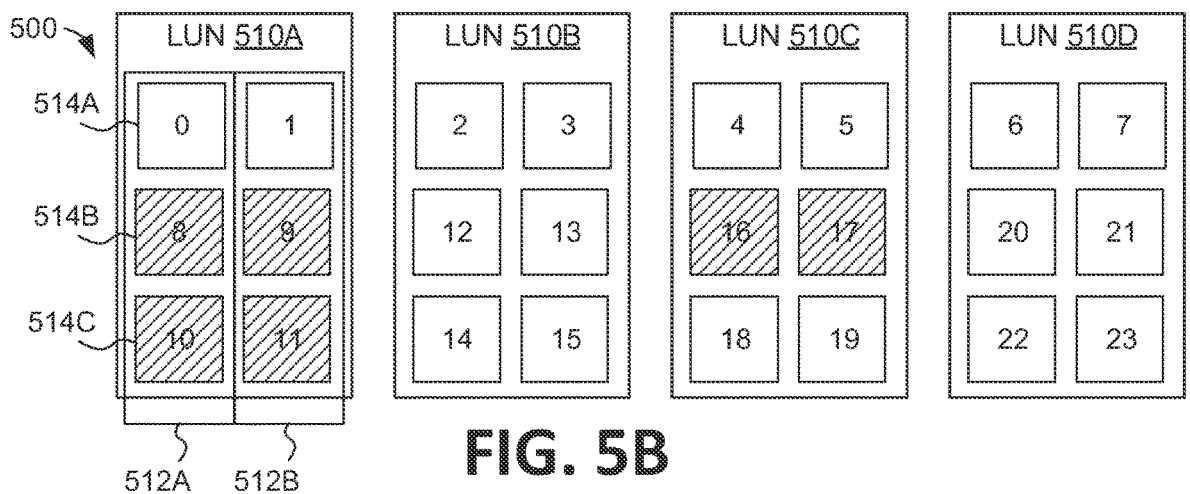
Figure 5C:
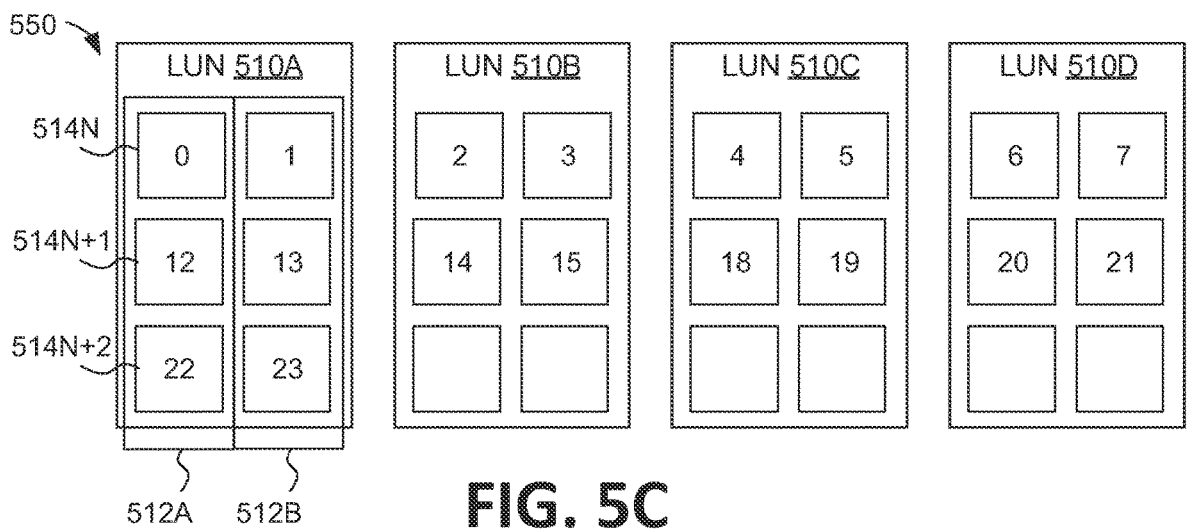

In some embodiments, data sequence manager 113 can copy the set of host data items from the first region to the second region in response to detecting that a memory management operation (e.g., a garbage collection operation) is to be performed at region 300, in accordance with embodiments described with respect to FIGS. 4-5C. Data sequence manager 113 can determine the sequence to copy the set of host data items based on one or more logical addresses associated with each of the set of host data items, in some embodiments. In some embodiments, data sequence manager 113 can determine a logical address associated with each of the set of host data items (e.g., based on a logical-to-physical (L2P) data structure maintained by memory subsystem controller 115, etc.) and determine, based on the determined logical addresses, a sequence of the set of host data items to be copied that corresponds to the target sequence. For example, with respect to FIG. 3A, data sequence manager 113 can determine that host data items having logical addresses of "0"-"7" are to be copied to memory cells for memory pages of a single stripe across LUNs 310 of region 350 (e.g., LUNs 310A-D or another set of LUNs of memory subsystem 110), as memory subsystem controller 115 is to perform a single programming operation (e.g., via data channels for LUNs 310A-D or the other set of LUNs) to access the copied host data items (i.e., in accordance with the target sequence.

Figure 3B:
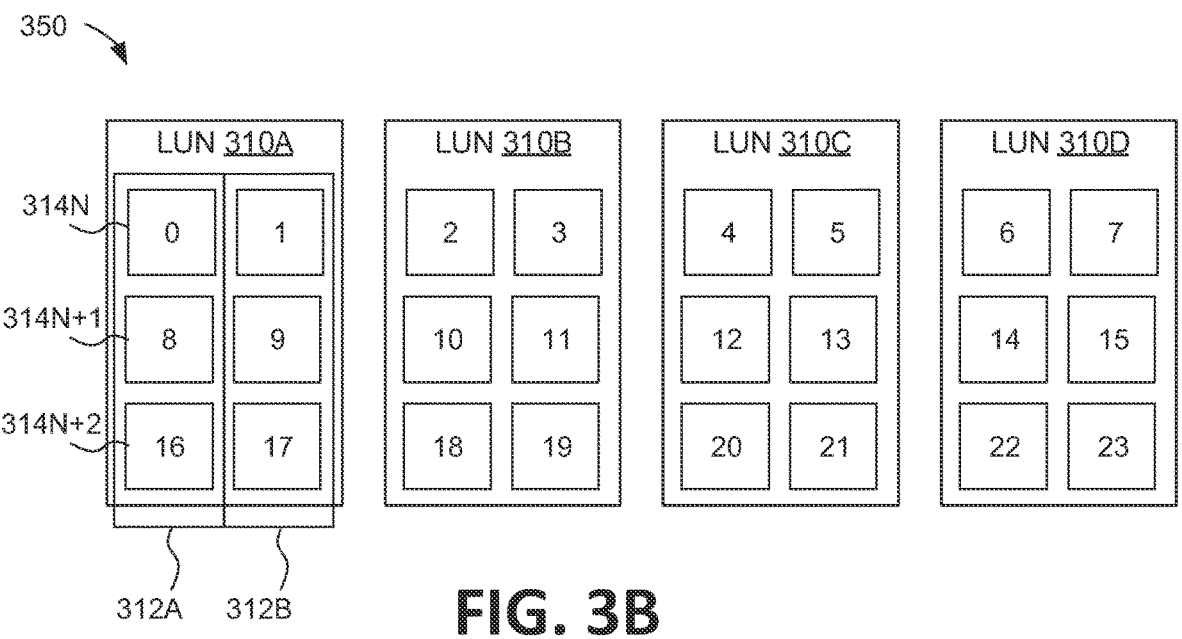

Responsive to determining the sequence to copy the set of host data items, data sequence manager 113 can copy the set of host data items to region 350, in accordance with the determined sequence. As illustrated in FIG. 3B, data sequence manager 113 can copy the set of host data items to memory cells of memory page 314N of a single stripe across LUNs 310A-D, in accordance with the determined sequence. It should be noted that although FIG. 3B illustrates the set of host data items being copied to memory cells of LUNs 310A-D, data sequence manager 113 can copy the set of host data items to memory cells of any memory page 314 of and LUN 310 of memory subsystem 11, in some embodiments. The sequence at which the set of host data items are copied across region 350 corresponds to the target sequence because memory subsystem controller 115 can perform a single read operation to access the host data associated with logical addresses "0"-"7" (i.e., via data channels connected to LUNs 310A-D). As further illustrated in FIG. 3B, data sequence manager 113 can copy other data items from region 300 to region 350 according to a sequence that corresponds to the target sequence, as described above. For example, data sequence manager 113 can copy data items having logical addresses "8"-"15" to memory pages 314N+1 across LUNs 310A-D and data items having logical addresses "16"-"23" to memory pages 314N+2 across LUNs 310A-D. Memory subsystem controller 115 can access the data items having logical addresses "8"-"15" by performing a single access operation via data channels connected to LUNs 310A-D. Memory subsystem controller 115 can similarly access the data items having logical addresses "16"-"23" by performing a single access operation via the data channels.

In some embodiments, data sequence manager 113 can erase the set of host data items from region 300 responsive to copying the host data to region 350. After the set of host data items are copied to region 350, the memory subsystem controller 115 can access the set of host data items via region 350, in accordance with previously described embodiments.

FIG. 4 is a flow diagram of another example method 400 for data reordering at a memory subsystem, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of method 400 are performed by the data sequence manager 113 of FIG. 1. In other or similar embodiments, one or more operations of method 400 is performed by another component of the memory subsystem controller, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 410, processing logic detects that a media management operation is to be performed at one or more first memory devices of a first region of a memory subsystem. In some embodiments, the media management operation can include a garbage collection operation. FIG. 5A illustrates an example of the first region 500 of memory subsystem 110, in accordance with some embodiments of the disclosure. As illustrated in FIG. 5A, region 500 can include one or more LUNs 510 (e.g., LUNs 510A-D). Each of LUNs 510A-D can correspond to a respective memory device (e.g., memory device 130, 140), in accordance with previously described embodiments. Each LUN 510 can include one or more planes (e.g., planes 512A, 512B, etc.) and each plane can include memory cells of one or more memory pages (e.g., pages 514A, 514B, 514C, etc.). As described with respect to FIGS. 3A-3B, although FIG. 5A depicts LUNs 510 including two planes and each plane including memory cells for three memory pages, region 500 can include any number of LUNs 510, LUNs 510 can include any number of planes 512, and planes 512 can include memory cells for any number of pages 514. Memory subsystem controller 115 can program host data items to region 500, in accordance with previously described embodiments. As illustrated in FIG. 5A, memory subsystem controller 115 can program host data items to memory cells across LUNs 510A-D in a sequence that does not correspond to a target sequence for region 500, as described above.

In some embodiments, memory subsystem controller 115 can detect that one or more host data items programmed to region 500 are invalid. In some embodiments, memory subsystem controller 115 can detect that a host data item is invalid in response to receiving a request (e.g., from host system 120) to remove or erase the host data item from memory. In other or similar embodiments, memory subsystem controller 115 can detect that a host data item is invalid in response to detecting that the host data item is out of date and/or is otherwise corrupted. As illustrated in FIG. 5B, memory subsystem controller 115 can detect that host data items having logical addresses of "8," "9," 10," "11," "16," and/or "17" are invalid. Memory subsystem controller 115 can update metadata associated with the host data items (e.g., in the L2P table maintained by memory subsystem controller 115, etc.) to indicate that the host data items are invalid and are not to be accessed.

Referring back to FIG. 4, at block 412, processing logic (e.g., data sequence manager 113) determines that a sequence at which data items were programmed across the one or more first memory devices does not correspond to the target sequence. In some embodiments, data sequence manager 113 can determine that the sequence does not correspond to the target sequence based on the number of access operations to be performed to access the set of host data items, in accordance with previously described embodiments. In some embodiments, data sequence manager 113 can determine that the sequence does not correspond to the target sequence before or after the memory subsystem controller 115 detects that a media management operation is to be performed at region 500.

At block 414, processing logic determines a sequence for copying the data items to one or more second memory devices of a second region of the memory subsystem. Data sequence manager 113 can determine the sequence for copying the data items, in accordance with previously described embodiments. In some embodiments, processing logic can determine the sequence for copying valid data items at region 500 (e.g., and ignores a sequence associated with invalid data items at region 500). The determined sequence can correspond to the target sequence, in accordance with previously described embodiments.

At block 416, processing logic copies the data items from the one or more first memory devices of the first region to the one or more second memory devices of the second region. In some embodiments, the one or more second memory devices can be different from the one or more first memory devices of the first region. In other or similar embodiments, the one or more second memory devices can include one or more of the same memory devices of the one or more first memory devices. As illustrated in FIG. 5C, data sequence manager 113 can copy the valid data items from region 500 to region 550, in some embodiments (e.g., in accordance with the garbage collection operation). In some embodiments, data sequence manager 113 can copy the valid data items to region 550 in accordance with the determined sequence.

At block 418, processing logic accesses the data items via the one or more second memory devices, in accordance with the target sequence. As described above, memory subsystem controller 115 can access host data items associated with logical addresses "0"-"7" by performing a single memory access operation via data channels connected to LUNs 510A-D, in accordance with the target sequence. As illustrated in FIG. 5C, as invalid data of region 500 is not copied to memory cells of region 550, memory cells of one or more pages 514 of region 550 may be available to store incoming host data. Memory subsystem controller 115 can program incoming host data items (e.g., from the memory buffer) to the memory cells of the available memory pages 514, in accordance with previously described embodiments.

Figure 6:
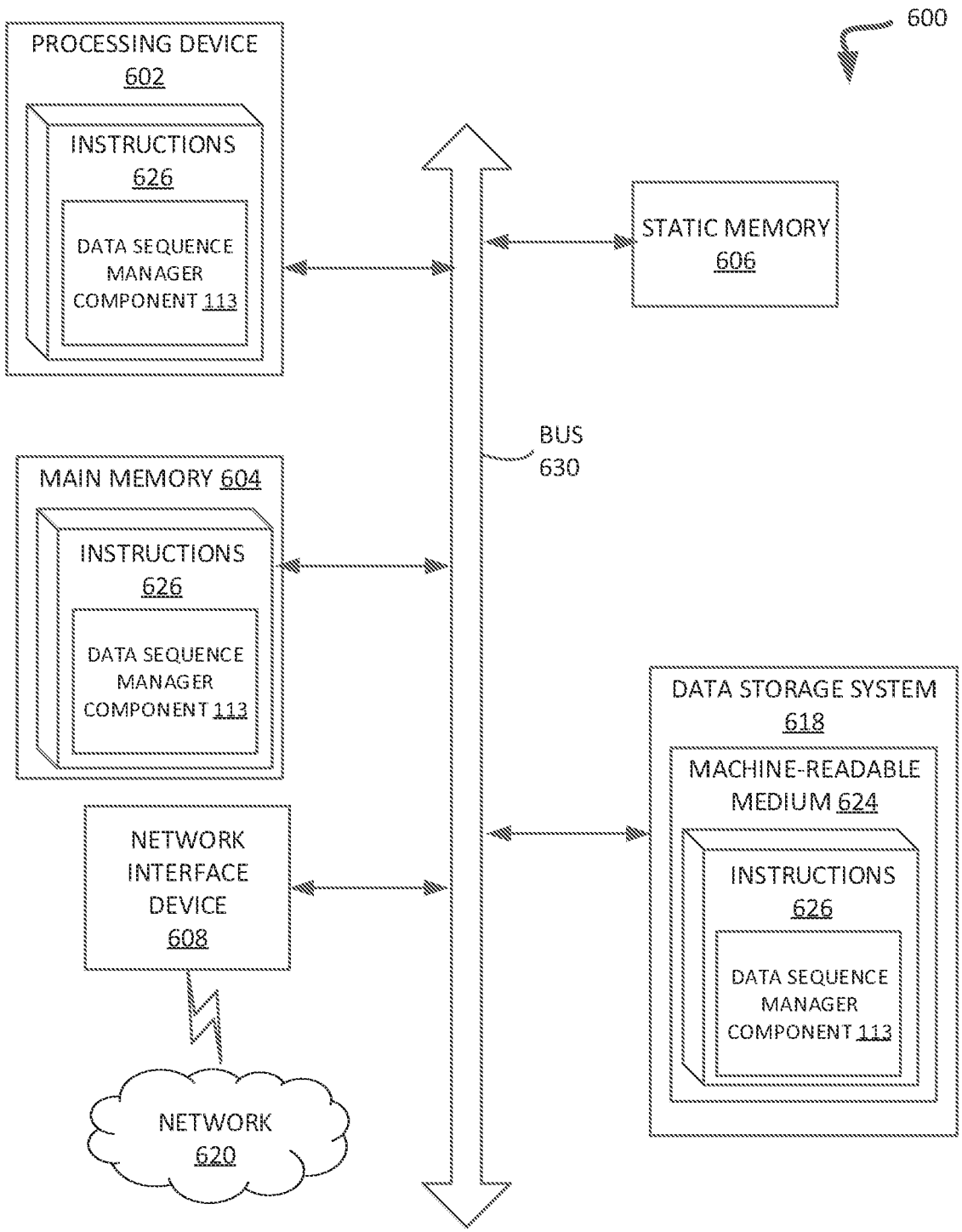
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the data sequence manager component 113 of FIG. 1). In alternative embodiments, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to memory subsystem 110 of FIG. 1.

In one embodiment, the instructions 626 include instructions to implement functionality corresponding to a voltage bin boundary component (e.g., the data sequence manager component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer.

Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
identifying a set of data items programmed to a first region of a memory subsystem, wherein the set of data items is programmed to the first region according to an initial sequence; determining whether the initial sequence corresponds to a target sequence associated with accessing the set of data items; and
responsive to determining that the initial sequence does not correspond to the target sequence, copying the set of data items from the first region to a second region of the memory subsystem according to the target sequence.

2. The method of claim 1, wherein the target sequence enables data items programmed to the memory subsystem to be accessed in parallel.

3. The method of claim 1, wherein determining whether the initial sequence corresponds to the target sequence comprises:
determining whether two or more of the set of data items programmed to the first region according to the initial sequence can be accessed in parallel.

4. The method of claim 1, further comprising:
detecting that a media management operation is to be performed at the memory subsystem, wherein the set of data items is copied from the first region to the second region of the memory subsystem upon an initiation of the media management operation.

5. The method of claim 4, wherein the media management operation comprises a garbage collection operation.

6. The method of claim 1, further comprising:
determining the initial sequence of the set of data items programmed to the first region based on one or more logical addresses associated with each of the set of data items.

7. The method of claim 1, wherein the set of data items are provided for programming to the memory subsystem according to at least one of a single-pass programming scheme or a multi-pass programming scheme.

8. The method of claim 1, further comprising:
performing one or more operations to access the set of data items at the second region in parallel.

9. A memory subsystem comprising: one or more memory devices; and
a processing device coupled to the one or more memory devices, the processing device to perform operations comprising:
identifying a set of data items programmed to a first region of the one or more memory devices, wherein the set of data items is programmed to the first region according to an initial sequence;
determining whether the initial sequence corresponds to a target sequence associated with accessing the set of data items; and
responsive to determining that the initial sequence does not correspond to the target sequence, copying the set of data items from the first region to a second region of the one or more memory devices according to the target sequence.

10. The memory subsystem of claim 9, wherein the target sequence enables data items programmed to the one or more memory devices to be accessed in parallel.

11. The memory subsystem of claim 9, wherein determining whether the initial sequence corresponds to the target sequence comprises:
determining whether two or more of the set of data items programmed to the first region according to the initial sequence can be accessed in parallel.

12. The memory subsystem of claim 9, wherein the operations further comprise:
detecting that a media management operation is to be performed at the one or more memory devices, wherein the set of data items is copied from the first region to the second region of the memory subsystem upon an initiation of the media management operation.

13. The memory subsystem of claim 12, wherein the media management operation comprises a garbage collection operation.

14. The memory subsystem of claim 9, wherein the operations further comprise: determining the initial sequence of the set of data items programmed to the first region based on one or more logical addresses associated with each of the set of data items.

15. A non-transitory computer-readable storage medium comprising instructions that, when executed by a processing device, cause the processing device to perform operations comprising:
identifying a set of data items programmed to a first region of a memory subsystem, wherein the set of data items is programmed to the first region according to an initial sequence; determining whether the initial sequence corresponds to a target sequence associated with accessing the set of data items; and responsive to determining that the initial sequence does not correspond to the target sequence, copying the set of data items from the first region to a second region of the memory subsystem according to the target sequence.

16. The non-transitory computer-readable storage medium of claim 15, wherein the target sequence enables data items programmed to the memory subsystem to be accessed in parallel.

17. The non-transitory computer-readable storage medium of claim 15, wherein determining whether the initial sequence corresponds to the target sequence comprises:

determining whether two or more of the set of data items programmed to the first region according to the initial sequence can be accessed in parallel.

18. The non-transitory computer-readable storage medium of claim 15, wherein the operations further comprise:

detecting that a media management operation is to be performed at the memory subsystem, wherein the set of data items is copied from the first region to the second region of the memory subsystem upon an initiation of the media management operation.

19. The non-transitory computer-readable storage medium of claim 18, wherein the media management operation comprises a garbage collection operation.

20. The non-transitory computer-readable storage medium of claim 15, wherein the operations further comprise:

determining the initial sequence of the set of data items programmed to the first region based on one or more logical addresses associated with each of the set of data items.

* * * * *